Patented Mar. 6, 1928.  1,661,832

UNITED STATES PATENT OFFICE.

FRIEDRICH IWANSKI, OF BERLIN-COPENICK, GERMANY.

PAVING MATERIAL AND PROCESS OF MAKING THE SAME.

No Drawing. Application filed September 27, 1926, Serial No. 138,111, and in Germany June 4, 1925.

This invention refers broadly to floor- and street pavements and the like, and in particular to pavements obtained by a mixture of inorganic or mineral and of bituminous material and it is intended to devise means of producing a pavement of the kind referred to which is more durable and less liable to become unduly softened than such pavements as obtained by the previous art. The invention makes use of a mixture of gravel or pebbles and lime dust, as heretofore suggested, which mixture is converted into bricks or moulding blocks which, after having been shaped by compression, are then impregnated with bituminous material under pressure or by boiling. Such blocks or mouldings consist for instance of a mixture of 85 to 90% of gravel and 10 to 15% of bitumen.

The impressions produced in the well known asphaltum plates, as well as the fissures occurring therein are due to the fact that the excessively large layers of bitumen have ceased to act as binding and pasting agents between the mineral constituents of the mass of the artificial stones or slabs, such bitumen on the contrary acting as a means of interrupting and insulating the mineral constituents of the block or stratum.

Now, these drawbacks are obviated by the subject matter of this invention which, as applied to the paving of floors and streets or roads, constitutes an important progress in modern building and road construction. The lime-and-sandstone moulding blocks according to this invention, which have been hardened by steam and are completely impregnated with bitumen, have been proved to be of great advantage not only on account of their superior resistance against the action of pressure and their breaking strength, but they are of importance also in view of the practical freedom from dust of the roads laid out with such pavement and the great resistibility against grinding off by traction.

Experimental roads which have been covered with the pavement according to this invention have evidenced their merits during extended use with heavy traffic and with loaded vehicles of all kinds. The success is mainly due to the fact that in the case of the compressed lime-sandstone-moulded blocks which are hardened with steam and manufactured and employed according to this invention, the petrifaction takes place by the action of the high-tension steam by the conversion of the addition of lime into limehydrosilicate which latter effects a chemical binding of the several granules of sand or gravel. The compressed blocks nevertheless retain their perviousness to air, and the bituminous substances are able to uniformly permeate the finely porous blocks under the action of pressure or of boiling. I consider it of importance to employ a bituminous substance instead of paraffines, fats, waxes or soaps, as heretofore suggested as an impregnating means for more or less porous bricks, flag-stones or the like, inasmuch as bituminous material possesses very considerable agglutinating, adhering sticking or binding action which is entirely absent in the case of the other impregnating materials referred to which fail to adhere to the mineral basic material, and are moreover open to the objection that they make the stone-block slippery and are easily dissolved and washed out by solvents, such as water and several hydrocarbons. There is the further advantage with the composition and treatment according to my invention that the basic stone material is preserved in its granular, natural state, only a minimum of lime being used merely as a binding agent, so that the material and the blocks formed therefrom will not readily crumble and become disintegrated, as it is the case with mixtures of throughout pulverized material.

The moulded blocks possess a high degree of strength and great durability even in changing climates, where they are exposed to considerable variations of temperature in the different seasons of the years.

It should, of course, be pointed out in this connection that the invention is not restricted to the selection of any particular kind or relative proportions of ingredients, sand, grit, pebbles or the like being for instance admissible as siliceous constituents and other changes or modifications may occur within the scope and spirit of the invention, as defined by the appended claims.

I claim:—

1. The process of manufacturing paving material, which consists in steam-hardening a mixture of an excess of highly siliceous granular material with lime, and impregnating the resulting product with bituminous substances.

2. The process of manufacturing paving material, which consists in compressing and steam-hardening a mixture of a large excess of granular highly siliceous material with a small amount of lime dust, and impregnating the resulting product with bituminous material.

3. The process of manufacturing paving material and the like, which consists in compressing and steam-hardening a mixture of a large excess of siliceous pebble-like material with a small amount of lime-dust, and finally impregnating the resulting product with bituminous substances.

4. The process of manufacturing paving material and the like which consists in steam-hardening a mixture of at least 85 percent of gravel with a small amount of lime-dust, and then incorporating bituminous material with the resulting product.

5. The process of manufacturing paving material and the like, which consists in compressing and steam-hardening a mixture of approximately 85 percent of granular, highly siliceous material with a small amount of lime-dust, and then incorporating bituminous material with the resulting product.

6. As a composition of matter blocks, suitable as paving material, and comprising a steam-hardened mixture of a large excess of granular highly siliceous stone-like material with a small amount of lime, and with bituminous matter.

7. A composition of matter, comprising a steam hardened mixture of 85–90% gravel and lime, impregnated with 10–15% bituminous matter.

In testimony whereof I affix my signature.

FRIEDRICH IWANSKI.